UNITED STATES PATENT OFFICE.

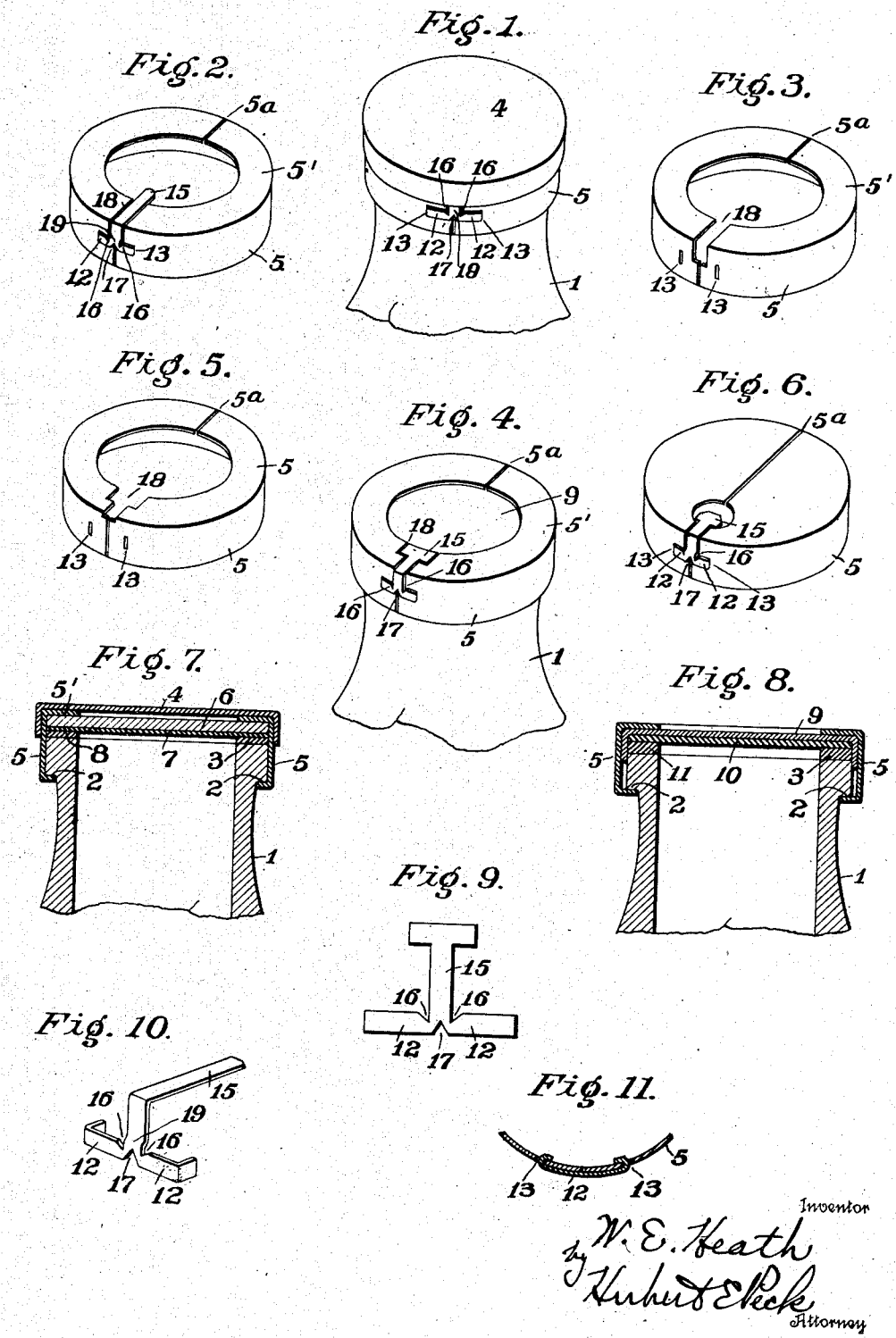

WILLIAM E. HEATH, OF BALTIMORE, MARYLAND, ASSIGNOR TO HEATH SELF-OPENING STOPPER COMPANY, OF BALTIMORE, MARYLAND, A CORPORATION OF DELAWARE.

SEAL FOR BOTTLES, JARS, AND OTHER RECEPTACLES.

1,186,900.   Specification of Letters Patent.   Patented June 13, 1916.

Application filed August 10, 1915. Serial No. 44,711.

*To all whom it may concern:*

Be it known that I, WILLIAM E. HEATH, a citizen of the United States, residing at Baltimore city, in the State of Maryland, have invented certain new and useful Improvements in Seals for Bottles, Jars, and other Receptacles, of which the following is a specification.

This invention relates to certain improvements in sealing devices for bottles, jars and other receptacles.

An object of the invention is to provide certain improvements in bottle sealing devices, wherein the seal is maintained by spinning or otherwise bending a metal flange under a locking shoulder of a bottle, jar or other receptacle, whereby the means securing or coupling together the ends of such flange can be readily broken or disconnected by the fingers and without the use of a tool or other implement, so that said flange may be spread and readily removed from the receptacle to break the seal.

Another object of the invention is to provide certain improvements in clips or securing devices for securing together the ends of metal receptacle sealing bands, whereby said clips may be easily removed or rendered inoperative to permit the spreading and removal of such sealing bands.

A further object of the invention is to provide certain improvements in details of construction and arrangement of parts, whereby a highly efficient and advantageous sealing device will be provided for receptacles.

The invention consists in certain novel constructions and arrangement of parts as hereinafter set forth and fully described.

Referring to the accompanying drawings, which show for purposes of explanation, constructions within the spirit and scope of my invention, from among others: Figure 1, is a perspective view of a sealing device applied to a receptacle, and illustrating one form of my invention. Fig. 2, is a detail perspective view of the locking and sealing band of Fig. 1, showing the clip applied thereto and locking together the ends thereof. Fig. 3, is a detail perspective view of the band of Fig. 2, showing the same before the clip has been applied. Fig. 4, is a detail perspective view of a somewhat different form of sealing device applied to a receptacle. Fig. 5, is a detail perspective view of the locking band of Fig. 4, the clip not being shown applied thereto. Fig. 6, is a detail perspective view of a modified form of locking band, the clip being shown applied thereto. Fig. 7, is a vertical sectional view through the sealing device of Fig. 1. Fig. 8, is a vertical sectional view through the sealing device of Fig. 4. Fig. 9, is a plan view of the clip of Fig. 4, showing the same flattened out or in blank form. Fig. 10, is a detail perspective view of the clip of Figs. 1 and 2, showing the same in readiness to be applied to the locking band. Fig. 11, is a detail sectional view to show the inner ends of the clip hooked or clenched at the inner surface of the depending flange of the locking band.

In the drawings, 1, indicates a bottle, jar or other receptacle having an exterior usually annular locking shoulder 2, arranged a distance below and adjacent the top sealing edge 3 around the mouth of the receptacle.

The sealing device of Figs. 1 and 7, comprises an outside frictionally held imperforate and flanged cap 4, a locking band 5, and suitable compressible and impervious material fitted within the locking band 5 and spanning the receptacle mouth and compressed by the band 5 against the top edge 3, of the receptacle to form a tight seal. The compressible element is shown in the form of an imperforate disk 6, of compressible material fitting snugly within the band 5, and closing the top opening thereof, and having its under surface faced by an impervious sheet 7 resting against a liner ring 8 fitting the top edge 3, of the receptacle mouth, although I do not wish to so limit all features of my invention.

The sealing device of Figs. 4 and 8, comprises the locking band or ring 5, an inside imperforate metal flanged sealing cap 9 fitted within the band 5, and having its under face covered by an impervious facing sheet 10, with a compressible sealing ring 11, fitting within the flange of the cap 9, and compressed against the top edge 3, of the receptacle, to maintain the seal.

Of course, cork, or other suitable compressible sealing medium disks may, if so desired, be employed within the cap 9.

The locking bands of Figs. 1, 7 and 4, 8, are preferably drawn from sheet metal and then the central portions of the tops cut out, leaving the horizontal top compressing flange 5'.

In the construction of Figs. 1 and 7, the locking band containing the sealing and compressing disk, is placed on the receptacle mouth and downward pressure is applied thereto to compress the disk, and while the disk is under pressure the lower edge of the flange of the band is turned or spun under the shoulder 2 to hold the disk compressed and to maintain the seal.

The outside cap 4, is slipped on the band 5, and held thereon by frictional engagement between the depending or vertical flanges.

The exterior cap 4, is usually decorated or finished and the locking band and sealing medium are usually fitted therein at the factory and so shipped to the consumer, ready for application to the receptacle to be sealed. If desired, the locking band may be used without the exterior cap.

In the construction shown in Figs. 4 and 8, the locking band is also bent or spun under the shoulder 2, while held down under pressure on the cap 9, to tightly compress the ring 11.

The locking band 5, in order to render the same removable from the receptacle mouth to break the seal, is cut through on one side and from top to bottom, to form two ends which are separated when the band is spread to clear the shoulder 2 and permit removal of the band from the bottle. The top flange 5' of the band 5, is also radially cut through at a point diametrically opposite the cut forming said two ends, so that the band will readily spread and bend at a point diametrically opposite the cut forming the two ends and in a vertical plane including the radial cut 5ᵃ in the top flange 5'.

Means are provided to lock together the two ends of the band 5, and hold the same in proper position before being locked to, and after being locked on, the receptacle; and said means must be capable of being rendered inoperative or ineffective, when it is desired to break the seal when removing the band from the receptacle.

For accomplishing this purpose I employ a metal clip stamped out or otherwise formed of tin or other suitable stiff sheet metal, and preferably against the grain of the metal, and consisting of a clip portion or band provided with a finger or pull piece, and arranged to lie horizontally against the outer surface of the depending flange of the locking band 5, bridging the cut therein, so as to overlap the two ends.

The ends of the band are formed with slots or perforations 13 in the depending flange of the band and adjacent the cut therethrough. The ends of the clip or clip-band 12 are bent inwardly to extend through the slots 13 and are then clenched down against the inner face of the band 5 (see Fig. 11), so that the ends of the clip are approximately hook-shaped and pass through the locking band ends to hold the same together against separation or spreading before, during, and after the operation of spinning the cap on the receptacle.

The locking or clip device shown is approximately in the form of an inverted T, with the finger or pull piece 15, rising from the central portion of the clip-band 12, at the junction between the locking band ends, and bent laterally at the top of the locking band, to extend inwardly or radially of the band in, or approximately in, the horizontal plane of the top or compressing flange of the band.

The clip device can be so formed that when the finger piece 15 is bent upwardly and pulled outwardly and backwardly, the band 12 will be severed at the cuts 16—17, thereby breaking the connection between the locking band ends, so that the said ends can be separated to spread the band and permit its removal from the receptacle.

To render the clip-band easily severed or broken, while still retaining sufficient strength to lock and hold together the sealing band ends, I can reduce the thickness thereof or otherwise weaken the same at the central portion. For instance, I show the clip-band formed with V-slots or other suitably shaped recesses or cuts 16, 17, extending transversely of the band from opposite edges thereof. The cuts 16, can extend down at opposite edges of the finger piece and the cut 17 can extend up immediately below the finger piece.

If found desirable, the lower ends of cuts 16, can extend below the horizontal plane including the upper end of cut 17. It is obvious that outward and downward pull on, or bending back of the finger piece, will transversely sever or break the clip-band at the ligaments between said slots.

Where the locking band 5, is intended to receive the exterior cap 4, it is desirable that the vertical portion of the finger piece 15, where it enters cap 4, should not rest against the outer face of the vertical flange of the locking band and hence, cause bulging of, or tend to lock or wedge the cap 4 against removal. I hence cut out portions of the ends of the locking band above the horizontal plane of the clip-band 12, to leave space or recess 18 (Fig. 3), between the locking band end edges, and of a sufficient width to snugly receive the finger piece 15 between said edges, and so that said piece can rest in said recess flush with the depending and top flanges of the locking band 5 (see Fig. 2).

I usually form the finger piece with an offset 19, just above the clip-band, to permit said piece to pass from the recess to the outer surface of the depending flange. I also usually extend the end of the finger piece beyond the flange 5' into the open center of the locking band, so that said end can be readily engaged and raised by the finger.

In the construction of Figs. 4 and 5, where an outside cap is not employed, the finger piece extends up at the outer surface of the depending flange of the locking band; the vertical flange not being recessed, except at the top edge where the finger piece is bent over; here, it is recessed the thickness of the metal. It is desirable, however, that the horizontal portion of the finger piece should be flush with the top surface of the flange 5', and hence, the adjoining ends of said horizontal flange are cut away to form a recess to receive said finger piece.

In Figs. 4 and 9, the finger piece is formed with an end head or enlargement to form a finger hold which preferably does not project inwardly beyond the inner edge of the horizontal flange 5', and which, by being formed with the head or enlargement as shown, causes the enlarged part of the finger piece to be locked in the horizontal flange 5', so that if the band should be subjected to rough handling, the finger piece would remain undisturbed, while in appearance, the horizontal flange of the locking band even to a critical eye, would seem to be unbroken, on account of the snug fit of the enlarged head of the finger piece in the recessed portion.

The locking band of Fig. 6, instead of having the open top and an annular top flange, as in the preceding figures of the drawings, is shown as of cap formation. In other words, the locking band is formed with top flanges, but they are so extended as to form a practically closed top, except for the diametrical slit or cut 5ª, which permits spreading and removal of the band, and the recess or opening to receive the finger piece and permit access thereto. I do not use the term "band" in the claims in a restricted sense, but use it to include a ring or band as well as a cap-like device embodying the novel features set forth.

The locking clip devices with their pull pieces can be formed in various shapes or designs, and each in a separate piece from and to be applied to, the locking band.

The locking clip devices can be easily and quickly stamped out, and applied and fastened to the locking bands by passing the bent ends (Fig. 10), through the slots 13, and then bending or clenching said ends against the inner surface of the bands.

What I claim is:—

1. A sealing device comprising a locking band severed to form ends, whereby the band can be released by separating its said ends, and a frangible clip formed of an independent piece with respect to the band and secured to and detachably holding together said band ends, and provided in one piece with a pull or finger piece arranged with respect to said clip to bend and break the same.

2. A weakened clip formed in one piece with a finger or pull tab extending laterally from an intermediate portion of said clip and adapted to cause severing of the clip, said clip adapted to be fastened to and detachably locking together the two ends formed by severing the locking band of a sealing device.

3. A clip formed in one piece with a finger or pull tab extending laterally from the clip at a point between its ends, said clip adapted to lap over and have its ends secured in the two ends formed by severing the locking band of a receptacle sealing device, said clip formed in a separate piece from said band and adapted to detachably lock together said ends thereof, said clip being formed frangible whereby outward pull on said tab will sever the locking connection of the clip between said ends, and thereby permit spreading and releasing of said band.

4. A clip having its ends formed to interlock with and detachably hold together the ends formed by severing a locking band of a receptacle sealing device, said clip formed with a finger or pull tab, said clip being so formed that outward pull on said tab will sever or break the clip and release said locking band ends and thereby permit spreading and release of said band.

5. A locking clip having its ends formed to interlock with the ends of a severed receptacle sealing and locking band to hold said band against spreading, said clip being weakened to render the same frangible and being provided with means for bending the clip to break the same, substantially as described.

6. A clip for detachably holding together the ends of a severed receptacle sealing and locking band, said clip being approximately T-shaped, the transverse portion forming the locking band, the ends of which are adapted to hook through slots in the ends of the sealing band and the laterally extending portion forming a finger hold or piece, said clip formed with a breaking line, substantially as described.

7. A locking clip having its ends bent to extend through slits in the ends of a severed receptacle sealing and locking band, for holding said band against spreading, said clip formed with a laterally extending finger hold, and being transversely weakened, whereby force applied to the finger hold transversely of the clip will cause breaking or severing thereof, thereby releasing the band for spreading, substantially as described.

8. A metal sealing and locking band for receptacles, adapted to be bent under the locking shoulder of the receptacle, and being cut to form two ends to permit spreading and removal from the receptacle, in combination with a clip formed of a separate piece from the band and extending across the band ends, and at its ends attached thereto for detachably locking the band against spreading, said clip formed integral with a finger piece or hold, extending vertically from an intermediate frangible portion thereof, substantially as described.

9. A metal sealing and locking band for receptacles, adapted to be bent under the locking shoulder of the receptacle, and being cut to form two ends to permit spreading and removal from the receptacle, in combination with a separately formed clip applied to the band and detachably locking together the ends thereof against spreading, said clip being frangible and formed integral with a finger piece extending upwardly therefrom and bent down and inwardly at the top of the band, substantially as described.

10. A metal sealing and locking band having its top recessed or cut away at the end edges of the band, formed by severing the same, in combination with a locking clip, at its ends secured to the band ends to lock the same together, said clip provided with a finger piece extending upwardly from an intermediate portion thereof and bent down at the top of the band into said recess and approximately flush with the top surface of the band.

11. A metal locking and sealing band severed to form ends, and having its end edges cut away to form a recess in the vertical and top portions thereof, in combination with a severable locking clip bridging the said ends, and at its ends secured thereto, said clip having a finger piece extending upwardly therefrom and bent down at the top of the band, said finger piece located in said recesses, for the purposes substantially as described.

12. A metal sealing and locking band for receptacles, adapted to be bent under the locking shoulder of a receptacle, and being cut through its vertical and top portions to form two ends to permit spreading and removal from the receptacle, a separately formed weakened clip attached to and extending across the band ends and detachably locking the same against spreading, said clip provided with a finger piece extending upwardly therefrom and bent down and inwardly at the top of the band, in combination with a flanged cap and a sealing medium.

13. A metal locking and sealing band having its end edges, formed by severing the band to form ends, cut away to form recesses in the vertical and horizontal portions thereof, a locking clip secured to and bridging said ends, said clip having a finger piece extending upwardly therefrom and bent down at the top and fitting in said recesses, in combination with a flanged metal cap, fitting said band, and a sealing medium, said finger piece approximately flush in said vertical and top recesses.

14. In combination, a flange cap, compressible sealing means, a locking band having its top recessed or cut away at its end edges, said band being cut through at its top and vertical portions to form ends, and a locking clip secured to and bridging said ends, said clip provided with a finger piece extending upwardly therefrom, and bent down into said recess and approximately flush with the top surface of the band.

In testimony whereof I affix my signature.

WILLIAM E. HEATH.